(12) United States Patent
Lesso

(10) Patent No.: US 12,135,774 B2
(45) Date of Patent: Nov. 5, 2024

(54) METHODS, APPARATUS AND SYSTEMS FOR BIOMETRIC PROCESSES

(71) Applicant: Cirrus Logic International Semiconductor Ltd., Edinburgh (GB)

(72) Inventor: John Paul Lesso, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 0 days.

(21) Appl. No.: 18/200,746

(22) Filed: May 23, 2023

(65) Prior Publication Data

US 2023/0289422 A1  Sep. 14, 2023

Related U.S. Application Data

(63) Continuation of application No. 17/191,425, filed on Mar. 3, 2021, now Pat. No. 11,714,888, which is a
(Continued)

(30) Foreign Application Priority Data

Jan. 30, 2018  (GB) ..................................... 1801527

(51) Int. Cl.
  *G06F 21/32*    (2013.01)
  *G06F 16/23*    (2019.01)
  (Continued)

(52) U.S. Cl.
  CPC .......... *G06F 21/32* (2013.01); *G06F 16/2379* (2019.01); *G06F 21/40* (2013.01);
  (Continued)

(58) Field of Classification Search
  None
  See application file for complete search history.

(56) References Cited

U.S. PATENT DOCUMENTS

| 5,197,113 A | 3/1993 | Mumolo |
| 5,568,559 A | 10/1996 | Makino |

(Continued)

FOREIGN PATENT DOCUMENTS

| AU | 2015202397 B2 | 5/2015 |
| CN | 1497970 A | 5/2004 |

(Continued)

OTHER PUBLICATIONS

Wu et al., A study on replay attack and anti-spoofing for text-dependent speaker verification, Signal and Information Processing Association Annual Summit and Conference (APSIPA), 2014 Asia-Pacific, Dec. 9-12, 2014, IEEE.

(Continued)

*Primary Examiner* — Brandon Hoffman
(74) *Attorney, Agent, or Firm* — Jackson Walker L.L.P.

(57) ABSTRACT

Embodiments of the invention relate to methods, apparatus and systems for biometric processes. The methods include updating stored ear model data for a user following successful authentication of the user. The ear model data may be acquired using a personal audio device that generates an acoustic stimulus and detects a measured response. The acquisition of the ear model data may be responsive to a determination that the personal audio device is inserted into or placed adjacent to the user's ear. The acquisition of the ear model data may also be responsive to the determination that the personal audio device has not been removed from or moved away from the user's ear.

19 Claims, 9 Drawing Sheets

Related U.S. Application Data continuation of application No. 16/028,964, filed on Jul. 6, 2018, now Pat. No. 11,042,618.

(60) Provisional application No. 62/529,752, filed on Jul. 7, 2017.

(51) Int. Cl.
  *G06F 21/40* (2013.01)
  *G10K 11/178* (2006.01)
  *G10L 17/00* (2013.01)
  *G10L 17/10* (2013.01)
  *G10L 17/24* (2013.01)

(52) U.S. Cl.
  CPC ........ *G10K 11/17823* (2018.01); *G10L 17/00* (2013.01); *G10K 2210/1081* (2013.01); *G10K 2210/3026* (2013.01); *G10K 2210/3027* (2013.01); *G10L 17/10* (2013.01); *G10L 17/24* (2013.01)

(56) References Cited

U.S. PATENT DOCUMENTS

| | | | |
|---|---|---|---|
| 5,710,866 A | 1/1998 | Alleva et al. | |
| 5,787,187 A | 7/1998 | Bouchard et al. | |
| 5,838,515 A | 11/1998 | Mortazavi et al. | |
| 6,182,037 B1 | 1/2001 | Maes | |
| 6,229,880 B1 | 5/2001 | Reformato et al. | |
| 6,249,237 B1 | 6/2001 | Prater | |
| 6,343,269 B1 | 1/2002 | Harada et al. | |
| 6,480,825 B1 | 11/2002 | Sharma et al. | |
| 7,016,833 B2 | 3/2006 | Gable et al. | |
| 7,039,951 B1 | 5/2006 | Chaudhari et al. | |
| 7,418,392 B1 | 8/2008 | Mozer et al. | |
| 7,492,913 B2 | 2/2009 | Connor et al. | |
| 8,442,824 B2 | 5/2013 | Aley-Raz et al. | |
| 8,489,399 B2 | 7/2013 | Gross | |
| 8,577,046 B2 | 11/2013 | Aoyagi | |
| 8,856,541 B1 | 10/2014 | Chaudhury et al. | |
| 8,997,191 B1 | 3/2015 | Stark et al. | |
| 9,049,983 B1 | 6/2015 | Baldwin | |
| 9,171,548 B2 | 10/2015 | Valius et al. | |
| 9,305,155 B1 | 4/2016 | Vo et al. | |
| 9,317,736 B1 | 4/2016 | Siddiqui | |
| 9,390,726 B1 | 7/2016 | Smus et al. | |
| 9,430,629 B1 | 8/2016 | Ziraknejad et al. | |
| 9,484,036 B2 | 11/2016 | Kons et al. | |
| 9,548,979 B1 | 1/2017 | Johnson et al. | |
| 9,600,064 B2 | 3/2017 | Lee et al. | |
| 9,613,640 B1 | 4/2017 | Balamurali et al. | |
| 9,641,585 B2 | 5/2017 | Kvaal et al. | |
| 9,646,261 B2 | 5/2017 | Agrafioli et al. | |
| 9,659,562 B2 | 5/2017 | Lovitt | |
| 9,665,784 B2 | 5/2017 | Derakhshani et al. | |
| 9,706,304 B1 | 7/2017 | Kelso et al. | |
| 9,865,253 B1 | 1/2018 | De Leon et al. | |
| 9,984,314 B2 | 5/2018 | Philipose et al. | |
| 9,990,926 B1 | 6/2018 | Pearce | |
| 10,032,451 B1 | 7/2018 | Mamkina et al. | |
| 10,063,542 B1 | 8/2018 | Kao | |
| 10,079,024 B1 | 9/2018 | Bhimanaik et al. | |
| 10,097,914 B2 * | 10/2018 | Petrank | G06F 3/165 |
| 10,192,553 B1 | 1/2019 | Chenier et al. | |
| 10,204,625 B2 | 2/2019 | Mishra et al. | |
| 10,210,685 B2 | 2/2019 | Borgmeyer | |
| 10,255,922 B1 | 4/2019 | Sharifi et al. | |
| 10,277,581 B2 | 4/2019 | Chandrasekharan et al. | |
| 10,305,895 B2 | 5/2019 | Barry et al. | |
| 10,318,580 B2 | 6/2019 | Topchy et al. | |
| 10,334,350 B2 | 6/2019 | Petrank | |
| 10,339,290 B2 | 7/2019 | Valendi et al. | |
| 10,460,095 B2 | 10/2019 | Boesen | |
| 10,467,509 B2 | 11/2019 | Albadawi et al. | |
| 10,692,492 B2 | 6/2020 | Rozen et al. | |
| 10,733,987 B1 | 8/2020 | Govender et al. | |
| 10,847,165 B2 | 11/2020 | Lesso | |
| 10,915,614 B2 | 2/2021 | Lesso | |
| 10,977,349 B2 | 4/2021 | Suh et al. | |
| 11,017,252 B2 | 5/2021 | Lesso | |
| 11,023,755 B2 | 6/2021 | Lesso | |
| 11,037,574 B2 | 6/2021 | Lesso | |
| 11,051,117 B2 | 6/2021 | Lesso | |
| 11,164,588 B2 | 11/2021 | Alonso et al. | |
| 11,276,409 B2 | 3/2022 | Lesso | |
| 2002/0169608 A1 | 11/2002 | Tamir et al. | |
| 2002/0194003 A1 | 12/2002 | Mozer | |
| 2003/0033145 A1 | 2/2003 | Petrushin | |
| 2003/0177006 A1 | 9/2003 | Ichikawa et al. | |
| 2003/0177007 A1 | 9/2003 | Kanazawa et al. | |
| 2003/0182119 A1 | 9/2003 | Junqua et al. | |
| 2004/0030550 A1 | 2/2004 | Liu | |
| 2004/0141418 A1 | 7/2004 | Matsuo et al. | |
| 2004/0230432 A1 | 11/2004 | Liu et al. | |
| 2005/0060153 A1 | 3/2005 | Gable et al. | |
| 2005/0107130 A1 | 5/2005 | Peterson, II | |
| 2005/0171774 A1 | 8/2005 | Applebaum et al. | |
| 2006/0116874 A1 | 6/2006 | Samuelsson et al. | |
| 2006/0171571 A1 | 8/2006 | Chan et al. | |
| 2007/0055517 A1 | 3/2007 | Spector | |
| 2007/0129941 A1 | 6/2007 | Tavares | |
| 2007/0185718 A1 | 8/2007 | Di Mambro et al. | |
| 2007/0233483 A1 | 10/2007 | Kuppuswamy et al. | |
| 2007/0250920 A1 | 10/2007 | Lindsay | |
| 2007/0276658 A1 | 11/2007 | Douglass | |
| 2008/0040615 A1 | 2/2008 | Carper et al. | |
| 2008/0071532 A1 | 3/2008 | Ramakrishnan et al. | |
| 2008/0082510 A1 | 4/2008 | Wang et al. | |
| 2008/0223646 A1 | 9/2008 | White | |
| 2008/0262382 A1 | 10/2008 | Akkermans et al. | |
| 2008/0285813 A1 | 11/2008 | Holm | |
| 2009/0087003 A1 | 4/2009 | Zurek et al. | |
| 2009/0105548 A1 | 4/2009 | Bart | |
| 2009/0167307 A1 | 7/2009 | Kopp | |
| 2009/0232361 A1 | 9/2009 | Miller | |
| 2009/0281809 A1 | 11/2009 | Reuss | |
| 2009/0319270 A1 | 12/2009 | Gross | |
| 2010/0004934 A1 | 1/2010 | Hirose et al. | |
| 2010/0076770 A1 | 3/2010 | Ramaswamy | |
| 2010/0106502 A1 | 4/2010 | Farrell et al. | |
| 2010/0106503 A1 | 4/2010 | Farrell et al. | |
| 2010/0204991 A1 | 8/2010 | Ramakrishnan et al. | |
| 2010/0328033 A1 | 12/2010 | Kamei | |
| 2011/0051907 A1 | 3/2011 | Jaiswal et al. | |
| 2011/0075857 A1 | 3/2011 | Aoyagi | |
| 2011/0142268 A1 | 6/2011 | Iwakuni et al. | |
| 2011/0246198 A1 | 10/2011 | Asenjo et al. | |
| 2011/0276323 A1 | 11/2011 | Seyfetdinov | |
| 2011/0314530 A1 | 12/2011 | Donaldson | |
| 2011/0317848 A1 | 12/2011 | Ivanov et al. | |
| 2012/0110341 A1 | 5/2012 | Beigi | |
| 2012/0223130 A1 | 9/2012 | Knopp et al. | |
| 2012/0224456 A1 | 9/2012 | Visser et al. | |
| 2012/0249328 A1 | 10/2012 | Xiong | |
| 2012/0323796 A1 | 12/2012 | Udani | |
| 2013/0024191 A1 | 1/2013 | Krutsch et al. | |
| 2013/0058488 A1 | 3/2013 | Cheng et al. | |
| 2013/0080167 A1 | 3/2013 | Mozer | |
| 2013/0132091 A1 | 5/2013 | Skerpac | |
| 2013/0225128 A1 | 8/2013 | Gomar | |
| 2013/0227678 A1 | 8/2013 | Kang | |
| 2013/0247082 A1 | 9/2013 | Wang et al. | |
| 2013/0279297 A1 | 10/2013 | Wulff et al. | |
| 2013/0279724 A1 | 10/2013 | Stafford et al. | |
| 2013/0289999 A1 | 10/2013 | Hymel | |
| 2014/0059347 A1 | 2/2014 | Dougherty et al. | |
| 2014/0146979 A1 | 5/2014 | Puskarich | |
| 2014/0149117 A1 | 5/2014 | Bakish et al. | |
| 2014/0172430 A1 | 6/2014 | Rutherford et al. | |
| 2014/0188770 A1 | 7/2014 | Agrafioti et al. | |
| 2014/0237576 A1 | 8/2014 | Zhang et al. | |
| 2014/0241597 A1 | 8/2014 | Leite | |
| 2014/0293749 A1 | 10/2014 | Gervaise | |
| 2014/0307876 A1 | 10/2014 | Agiomyrgiannakis et al. | |

(56) References Cited

U.S. PATENT DOCUMENTS

| | | |
|---|---|---|
| 2014/0330568 A1 | 11/2014 | Lewis et al. |
| 2014/0337945 A1 | 11/2014 | Jia et al. |
| 2014/0343703 A1 | 11/2014 | Topchy et al. |
| 2014/0358353 A1 | 12/2014 | Ibanez-Guzman et al. |
| 2014/0358535 A1 | 12/2014 | Lee et al. |
| 2015/0006163 A1 | 1/2015 | Liu et al. |
| 2015/0028996 A1 | 1/2015 | Agrafioti et al. |
| 2015/0033305 A1 | 1/2015 | Shear et al. |
| 2015/0036462 A1 | 2/2015 | Calvarese |
| 2015/0088509 A1 | 3/2015 | Gimenez et al. |
| 2015/0089616 A1 | 3/2015 | Brezinski et al. |
| 2015/0112682 A1 | 4/2015 | Rodriguez et al. |
| 2015/0134330 A1 | 5/2015 | Baldwin et al. |
| 2015/0161370 A1 | 6/2015 | North et al. |
| 2015/0161459 A1 | 6/2015 | Boczek |
| 2015/0168996 A1 | 6/2015 | Sharpe et al. |
| 2015/0245154 A1 | 8/2015 | Dadu et al. |
| 2015/0261944 A1 | 9/2015 | Hosom et al. |
| 2015/0276254 A1 | 10/2015 | Nemcel et al. |
| 2015/0301796 A1 | 10/2015 | Visser et al. |
| 2015/0332665 A1 | 11/2015 | Mishra et al. |
| 2015/0347734 A1 | 12/2015 | Beigi |
| 2015/0356974 A1 | 12/2015 | Tani et al. |
| 2015/0371639 A1 | 12/2015 | Foerster et al. |
| 2016/0007118 A1 | 1/2016 | Lee et al. |
| 2016/0026781 A1 | 1/2016 | Boczek |
| 2016/0066113 A1 | 3/2016 | Elkhatib et al. |
| 2016/0071516 A1 | 3/2016 | Lee et al. |
| 2016/0086607 A1 | 3/2016 | Aley-Raz et al. |
| 2016/0086609 A1 | 3/2016 | Yue et al. |
| 2016/0111112 A1 | 4/2016 | Hayakawa |
| 2016/0125877 A1 | 5/2016 | Foerster et al. |
| 2016/0125879 A1 | 5/2016 | Lovitt |
| 2016/0147987 A1 | 5/2016 | Jang et al. |
| 2016/0148012 A1 | 5/2016 | Khitrov et al. |
| 2016/0182998 A1 | 6/2016 | Galal et al. |
| 2016/0210111 A1 | 7/2016 | Kraft |
| 2016/0210407 A1 | 7/2016 | Hwang et al. |
| 2016/0217321 A1 | 7/2016 | Gottleib |
| 2016/0217795 A1 | 7/2016 | Lee et al. |
| 2016/0234204 A1 | 8/2016 | Rishi et al. |
| 2016/0248768 A1 | 8/2016 | McLaren et al. |
| 2016/0314790 A1 | 10/2016 | Tsujikawa et al. |
| 2016/0324478 A1 | 11/2016 | Goldstein |
| 2016/0330198 A1 | 11/2016 | Stern et al. |
| 2016/0371555 A1 | 12/2016 | Derakhshani |
| 2016/0372139 A1 | 12/2016 | Cho et al. |
| 2017/0011406 A1 | 1/2017 | Tunnell et al. |
| 2017/0049335 A1 | 2/2017 | Duddy |
| 2017/0068805 A1 | 3/2017 | Chandrasekharan et al. |
| 2017/0078780 A1 | 3/2017 | Qian et al. |
| 2017/0110117 A1 | 4/2017 | Chakladar et al. |
| 2017/0110121 A1 | 4/2017 | Warford et al. |
| 2017/0112671 A1 | 4/2017 | Goldstein |
| 2017/0116995 A1 | 4/2017 | Ady et al. |
| 2017/0134377 A1 | 5/2017 | Tokunaga et al. |
| 2017/0150254 A1 | 5/2017 | Bakish et al. |
| 2017/0161482 A1 | 6/2017 | Eltoft et al. |
| 2017/0162198 A1 | 6/2017 | Chakladar et al. |
| 2017/0169828 A1 | 6/2017 | Sachdev |
| 2017/0200451 A1 | 7/2017 | Bocklet et al. |
| 2017/0213268 A1 | 7/2017 | Puehse et al. |
| 2017/0214687 A1 | 7/2017 | Klein et al. |
| 2017/0231534 A1 | 8/2017 | Agassy et al. |
| 2017/0242990 A1 | 8/2017 | Chien |
| 2017/0256270 A1 | 9/2017 | Singaraju et al. |
| 2017/0279815 A1 | 9/2017 | Chung et al. |
| 2017/0287490 A1 | 10/2017 | Biswal et al. |
| 2017/0293749 A1 | 10/2017 | Baek et al. |
| 2017/0323644 A1 | 11/2017 | Kawato |
| 2017/0347180 A1 | 11/2017 | Petrank |
| 2017/0347348 A1 | 11/2017 | Masaki et al. |
| 2017/0351487 A1 | 12/2017 | Aviles-Casco Vaquero et al. |
| 2017/0373655 A1 | 12/2017 | Mengad et al. |
| 2018/0018974 A1 | 1/2018 | Zass |
| 2018/0032712 A1 | 2/2018 | Oh et al. |
| 2018/0039769 A1 | 2/2018 | Saunders et al. |
| 2018/0047393 A1 | 2/2018 | Tian et al. |
| 2018/0060552 A1 | 3/2018 | Pellom et al. |
| 2018/0060557 A1 | 3/2018 | Valenti et al. |
| 2018/0096120 A1 | 4/2018 | Boesen |
| 2018/0107866 A1 | 4/2018 | Li et al. |
| 2018/0108225 A1 | 4/2018 | Mappus et al. |
| 2018/0113673 A1* | 4/2018 | Sheynblat ............... G10L 17/00 |
| 2018/0121161 A1 | 5/2018 | Ueno et al. |
| 2018/0146370 A1 | 5/2018 | Krishnaswamy et al. |
| 2018/0166071 A1 | 6/2018 | Lee et al. |
| 2018/0174600 A1 | 6/2018 | Chaudhuri et al. |
| 2018/0176215 A1 | 6/2018 | Perotti et al. |
| 2018/0187969 A1 | 7/2018 | Kim et al. |
| 2018/0191501 A1 | 7/2018 | Lindemann |
| 2018/0197525 A1 | 7/2018 | Kikuhara et al. |
| 2018/0232201 A1 | 8/2018 | Holtmann |
| 2018/0232511 A1 | 8/2018 | Bakish |
| 2018/0233142 A1 | 8/2018 | Koishida et al. |
| 2018/0239955 A1 | 8/2018 | Rodriguez et al. |
| 2018/0240463 A1 | 8/2018 | Perotti |
| 2018/0254046 A1 | 9/2018 | Khoury et al. |
| 2018/0289354 A1 | 10/2018 | Cvijanovic et al. |
| 2018/0292523 A1 | 10/2018 | Orenstein et al. |
| 2018/0308487 A1 | 10/2018 | Goel et al. |
| 2018/0324518 A1 | 11/2018 | Dusan et al. |
| 2018/0330727 A1 | 11/2018 | Tulli |
| 2018/0336716 A1 | 11/2018 | Ramprashad et al. |
| 2018/0336901 A1 | 11/2018 | Masaki et al. |
| 2018/0342237 A1 | 11/2018 | Lee et al. |
| 2018/0349585 A1 | 12/2018 | Ahn et al. |
| 2018/0352332 A1 | 12/2018 | Tao |
| 2018/0358020 A1 | 12/2018 | Chen et al. |
| 2018/0366124 A1 | 12/2018 | Cilingir et al. |
| 2018/0374487 A1 | 12/2018 | Lesso |
| 2018/0376234 A1 | 12/2018 | Petrank |
| 2019/0005963 A1 | 1/2019 | Alonso et al. |
| 2019/0005964 A1 | 1/2019 | Alonso et al. |
| 2019/0013033 A1 | 1/2019 | Bhimanaik et al. |
| 2019/0027152 A1 | 1/2019 | Huang et al. |
| 2019/0030452 A1 | 1/2019 | Fassbender et al. |
| 2019/0042871 A1 | 2/2019 | Pogorelik |
| 2019/0043512 A1 | 2/2019 | Huang et al. |
| 2019/0065478 A1 | 2/2019 | Tsujikawa et al. |
| 2019/0098003 A1 | 3/2019 | Ota |
| 2019/0103115 A1 | 4/2019 | Lesso |
| 2019/0114496 A1 | 4/2019 | Lesso |
| 2019/0114497 A1 | 4/2019 | Lesso |
| 2019/0115030 A1 | 4/2019 | Lesso |
| 2019/0115032 A1 | 4/2019 | Lesso |
| 2019/0115033 A1 | 4/2019 | Lesso |
| 2019/0115046 A1 | 4/2019 | Lesso |
| 2019/0122670 A1 | 4/2019 | Roberts et al. |
| 2019/0147888 A1 | 5/2019 | Lesso |
| 2019/0149920 A1 | 5/2019 | Putzeys et al. |
| 2019/0149932 A1 | 5/2019 | Lesso |
| 2019/0180014 A1 | 6/2019 | Kovvali et al. |
| 2019/0197755 A1 | 6/2019 | Vats |
| 2019/0199935 A1 | 6/2019 | Danielsen et al. |
| 2019/0228778 A1 | 7/2019 | Lesso |
| 2019/0228779 A1 | 7/2019 | Lesso |
| 2019/0246075 A1 | 8/2019 | Khadloya et al. |
| 2019/0260731 A1 | 8/2019 | Chandrasekharan et al. |
| 2019/0287536 A1 | 9/2019 | Sharifi et al. |
| 2019/0294629 A1 | 9/2019 | Wexler et al. |
| 2019/0295554 A1 | 9/2019 | Lesso |
| 2019/0304470 A1 | 10/2019 | Ghaemmaghami et al. |
| 2019/0306594 A1 | 10/2019 | Aumer et al. |
| 2019/0306613 A1 | 10/2019 | Qian et al. |
| 2019/0311722 A1 | 10/2019 | Caldwell |
| 2019/0313014 A1 | 10/2019 | Welbourne et al. |
| 2019/0318035 A1 | 10/2019 | Blanco et al. |
| 2019/0356588 A1 | 11/2019 | Shahraray et al. |
| 2019/0371330 A1 | 12/2019 | Lin et al. |
| 2019/0372969 A1 | 12/2019 | Chang et al. |
| 2019/0373438 A1 | 12/2019 | Amir et al. |
| 2019/0392145 A1 | 12/2019 | Komogortsev |
| 2019/0394195 A1 | 12/2019 | Chari et al. |

(56) References Cited

U.S. PATENT DOCUMENTS

| | | |
|---|---|---|
| 2020/0035247 A1 | 1/2020 | Boyadjiev et al. |
| 2020/0184057 A1 | 6/2020 | Mukund |
| 2020/0204937 A1 | 6/2020 | Lesso |
| 2020/0227071 A1 | 7/2020 | Lesso |
| 2020/0265834 A1 | 8/2020 | Lesso et al. |
| 2020/0286492 A1 | 9/2020 | Lesso |
| 2021/0303669 A1 | 9/2021 | Lesso |
| 2022/0382846 A1 | 12/2022 | Koshinaka et al. |

FOREIGN PATENT DOCUMENTS

| | | |
|---|---|---|
| CN | 1937955 A | 3/2007 |
| CN | 101228787 A | 7/2008 |
| CN | 101578637 A | 11/2009 |
| CN | 102246228 A | 11/2011 |
| CN | 103109495 A | 5/2013 |
| CN | 103477604 A | 12/2013 |
| CN | 104038625 A | 9/2014 |
| CN | 104252860 A | 12/2014 |
| CN | 104956715 A | 9/2015 |
| CN | 105185380 A | 12/2015 |
| CN | 105244031 A | 1/2016 |
| CN | 105869630 A | 8/2016 |
| CN | 105913855 A | 8/2016 |
| CN | 105933272 A | 9/2016 |
| CN | 105938716 A | 9/2016 |
| CN | 106297772 A | 1/2017 |
| CN | 106531172 A | 3/2017 |
| CN | 107251573 A | 10/2017 |
| EP | 1205884 A2 | 5/2002 |
| EP | 1600791 A1 | 11/2005 |
| EP | 1701587 A1 | 9/2006 |
| EP | 1928213 A1 | 6/2008 |
| EP | 1965331 A2 | 9/2008 |
| EP | 2660813 A1 | 11/2013 |
| EP | 2704052 A2 | 3/2014 |
| EP | 2860706 A2 | 4/2015 |
| EP | 3016314 A1 | 5/2016 |
| EP | 3156978 A1 | 4/2017 |
| EP | 3466106 A1 | 4/2019 |
| GB | 2375205 A | 11/2002 |
| GB | 2493849 A | 2/2013 |
| GB | 2499781 A | 9/2013 |
| GB | 2515527 A | 12/2014 |
| GB | 2541466 A | 2/2017 |
| GB | 2551209 A | 12/2017 |
| IN | 105702263 A | 6/2016 |
| IN | 106537889 A | 3/2017 |
| JP | 2003058190 A | 2/2003 |
| JP | 2006010809 A | 1/2006 |
| JP | 2010086328 A | 4/2010 |
| TW | 200820218 A | 5/2008 |
| WO | 9834216 A2 | 8/1998 |
| WO | 0208147 A1 | 10/2002 |
| WO | 02/103680 A2 | 12/2002 |
| WO | 2006054205 A1 | 5/2006 |
| WO | 2007034371 A2 | 3/2007 |
| WO | 2008113024 A1 | 9/2008 |
| WO | 2010066269 A1 | 6/2010 |
| WO | 2013022930 A1 | 2/2013 |
| WO | 2013154790 A1 | 10/2013 |
| WO | 2014040124 A1 | 3/2014 |
| WO | 2015117674 A1 | 8/2015 |
| WO | 2015163774 A1 | 10/2015 |
| WO | 2016003299 A1 | 1/2016 |
| WO | 2017055551 A | 4/2017 |
| WO | 2017203484 A1 | 11/2017 |
| WO | 2019002831 A1 | 1/2019 |
| WO | 2019008387 A1 | 1/2019 |
| WO | 2019008389 A1 | 1/2019 |
| WO | 2019008392 A1 | 1/2019 |

OTHER PUBLICATIONS

Jain et al, An Introduction to Biometric Recognition, IEEE Transactions on Circuits and Systems for Video Technology, vol. 14, No. 1, pp. 4-20, Jan. 2004.

Wu, Libing, et al., LVID: A Multimodal Biometracas Authentication System on Smartphones, IEEE Transactions on Information Forensics and Security, Vo. 15, 2020, pp. 1572-1585.

Wang, Qian, et al., VoicePop: A Pop Noise based Anti-spoofing System for Voice Authentication on Smartphones, IEEE INFOCOM 2019—IEEE Conference on Computer Communications, Apr. 29-May 2, 2019, pp. 2062-2070.

Examination Report under Section 18(3), UKIPO, Application No. GB1918956.2, mailed Jul. 29, 2021.

Examination Report under Section 18(3), UKIPO, Application No. GB1918965.3, mailed Aug. 2, 2021.

Combined Search and Examination Report under Sections 17 and 18(3), UKIPO, Application No. GB2105613.0, mailed Sep. 27, 2021.

Combined Search and Examination Report under Sections 17 and 18(3), UKIPO, Application No. GB2114337.5, mailed Nov. 3, 2021.

Combined Search and Examination Report under Sections 17 and 18(3), UKIPO, Application No. GB2112228.8, mailed May 17, 2022.

Search Report under Section 17, UKIPO, Application No. GB2202521.7, mailed Jun. 21, 2022.

Combined Search and Examination Report under Sections 17 and 18(3), UKIPO, Application No. GB2210986.2, mailed Nov. 15, 2022.

First Office Action, China National Intellectual Property Administration, Application No. 201800658351, mailed Feb. 4, 2023.

Search Report, China National Intellectual Property Administration, Application No. 201800658351, dated Feb. 2, 2023.

First Office Action, China National Intellectual Property Administration, Application No. 2018800452077, mailed Feb. 25, 2023.

First Office Action, China National Intellectual Property Administration, Application No. 2018800452787, mailed Mar. 14, 2023.

First Office Action, China National Intellectual Property Administration, Patent Application No. 2018800419187, issued Feb. 28, 2023.

Notice of Preliminary Rejection, Korean Intellectual Property Office, Patent Application No. 10-2020-7002065, dated Apr. 17, 2023.

Notice of Preliminary Rejection, Korean Intellectual Property Office, Patent Application No. 10-2020-7002061, dated Apr. 27, 2023.

International Search Report and Written Opinion of the International Searching Authority, International Application No. PCT/GB2019/052302, mailed Oct. 2, 2019.

Liu, Yuan et al., "Speaker verification with deep features", Jul. 2014, in International Joint Conference on Neural Networks (IJCNN), pp. 747-753, IEEE.

International Search Report and Written Opinion of the International Searching Authority, International Application No. PCT/GB2018/051927, mailed Sep. 25, 2018.

Combined Search and Examination Report under Sections 17 and 18(3), UKIPO, Application No. 1801530.5, mailed Jul. 25, 2018.

International Search Report and Written Opinion of the International Searching Authority, International Application No. PCT/GB2018/051924, mailed Sep. 26, 2018.

Combined Search and Examination Report under Sections 17 and 18(3), UKIPO, Application No. 1801526.3, mailed Jul. 25, 2018.

International Search Report and Written Opinion of the International Searching Authority, International Application No. PCT/GB2018/051931, mailed Sep. 27, 2018.

Combined Search and Examination Report under Sections 17 and 18(3), UKIPO, Application No. 1801527.1, mailed Jul. 25, 2018.

International Search Report and Written Opinion of the International Searching Authority, International Application No. PCT/GB2018/051925, mailed Sep. 26, 2018.

Combined Search and Examination Report under Sections 17 and 18(3), UKIPO, Application No. 1801528.9, mailed Jul. 25, 2018.

International Search Report and Written Opinion of the International Searching Authority, International Application No. PCT/GB2018/051928, mailed Dec. 3, 2018.

(56) References Cited

OTHER PUBLICATIONS

Combined Search and Examination Report under Sections 17 and 18(3), UKIPO, Application No. 1801532.1, mailed Jul. 25, 2018.
Lim, Zhi Hao et al., An Investigation of Spectral Feature Partitioning for Replay Attacks Detection, Proceedings of APSIPA Annual Summit and Conference 2017, Dec. 12-15, 2017, Malaysia, pp. 1570-1573.
International Search Report and Written Opinion of the International Searching Authority, International Application No. PCT/GB2018/053274, mailed Jan. 24, 2019.
Beigi, Homayoon, "Fundamentals of Speaker Recognition," Chapters 8-10, ISBN: 978-0-378-77592-0; 2011.
Li, Lantian et al., "A Study on Replay Attack and Anti-Spoofing for Automatic Speaker Verification", INTERSPEECH 2017, Jan. 1, 2017, pp. 92-96.
Li, Zhi et al., "Compensation of Hysteresis Nonlinearity in Magnetostrictive Actuators with Inverse Multiplicative Structure for Preisach Model", IEE Transactions on Automation Science and Engineering, vol. 11, No. 2, Apr. 1, 2014, pp. 613-619.
Partial International Search Report of the International Searching Authority, International Application No. PCT/GB2018/052905, mailed Jan. 25, 2019.
Further Search Report under Sections 17 (6), UKIPO, Application No. GB1719731.0, mailed Nov. 26, 2018.
Combined Search and Examination Report, UKIPO, Application No. GB1713695.3, mailed Feb. 19, 2018.
Zhang et al., An Investigation of Deep-Learing Frameworks for Speaker Verification Antispoofing—IEEE Journal of Selected Topics in Signal Processes, Jun. 1, 2017.
Combined Search and Examination Report under Sections 17 and 18(3), UKIPO, Application No. GB1804843.9, mailed Sep. 27, 2018.
Wu et al., Anti-Spoofing for text-Independent Speaker Verification: An Initial Database, Comparison of Countermeasures, and Human Performance, IEEE/ACM Transactions on Audio, Speech, and Language Processing, Issue Date: Apr. 2016.
Combined Search and Examination Report under Sections 17 and 18(3), UKIPO, Application No. GB1803570.9, mailed Aug. 21, 2018.
Combined Search and Examination Report under Sections 17 and 18(3), UKIPO, Application No. GB1801661.8, mailed Jul. 30, 2018.
Combined Search and Examination Report under Sections 17 and 18(3), UKIPO, Application No. GB1801663.4, mailed Jul. 18, 2018.
Combined Search and Examination Report under Sections 17 and 18(3), UKIPO, Application No. GB1801664.2, mailed Aug. 1, 2018.
Combined Search and Examination Report under Sections 17 and 18(3), UKIPO, Application No. GB1719731.0, mailed May 16, 2018.
Combined Search and Examination Report, UKIPO, Application No. GB1801874.7, mailed Jul. 25, 2018.
Combined Search and Examination Report under Sections 17 and 18(3), UKIPO, Application No. GB1801659.2, mailed Jul. 26, 2018.
International Search Report and Written Opinion of the International Searching Authority, International Application No. PCT/GB2018/052906, mailed Jan. 14, 2019.
International Search Report and Written Opinion of the International Searching Authority, International Application No. PCT/GB2019/050185, mailed Apr. 2, 2019.
Combined Search and Examination Report under Sections 17 and 18(3), UKIPO, Application No. GB1809474.8, mailed Jul. 23, 2018.
Ajmera, et al.,, "Robust Speaker Change Detection," IEEE Signal Processing Letters, vol. 11, No. 8, pp. 649-651, Aug. 2004.
International Search Report and Written Opinion of the International Searching Authority, International Application No. PCT/GB2018/051760, mailed Aug. 3, 2018.
International Search Report and Written Opinion of the International Searching Authority, International Application No. PCT/GB2018/051787, mailed Aug. 16, 2018.
Villalba, Jesus et al., Preventing Replay Attacks on Speaker Verification Systems, International Carnahan Conference on Security Technology (ICCST), 2011 IEEE, Oct. 18, 2011, pp. 1-8.
International Search Report and Written Opinion of the International Searching Authority, International Application No. PCT/GB2018/051765, mailed Aug. 16, 2018.
Combined Search and Examination Report under Sections 17 and 18(3), UKIPO, Application No. GB1713697.9, mailed Feb. 20, 2018.
Chen et al., "You Can Hear But You Cannot Steal: Defending Against Voice Impersonation Attacks on Smartphones", Proceedings of the International Conference on Distributed Computing Systems, PD: 20170605.
International Search Report and Written Opinion of the International Searching Authority, International Application No. PCT/GB2018/052907, mailed Jan. 15, 2019.
Combined Search and Examination Report under Sections 17 and 18(3), UKIPO, Application No. GB1713699.5, mailed Feb. 21, 2018.
International Search Report and Written Opinion of the International Searching Authority, International Application No. PCT/GB2019/052143, mailed Sep. 17, 2019.
Lucas, Jim, What Is Electromagnetic Radiation? Live Science, Mar. 13, 2015, NY, NY.
Brownlee, Jason, A Gentle Introduction to Autocorrelation and Partial Autocorrelation, Feb. 6, 2017, https://machinelearningmastery.com/gentle-introduction-autocorrelation-partial-autocorrelation/, accessed Apr. 28, 2020.
Ohtsuka, Takahiro and Kasuya, Hideki, Robust ARX Speech Analysis Method Taking Voice Source Pulse Train Into Account, Journal of the Acoustical Society of Japan, 58, 7, pp. 386-397, 2002.
Wikipedia, Voice (phonetics), https://en.wikipedia.org/wiki/Voice_(phonetics), accessed Jun. 1, 2020.
Zhang et al., DolphinAttack: Inaudible Voice Commands, Retrieved from Proceedings of the 2017 ACM SIGSAC Conference on Computer and Communications Security, Aug. 2017.
Song, Liwei, and Prateek Mittal, Poster: Inaudible Voice Commands, Proceedings of the 2017 ACM SIGSAC Conference on Computer and Communications Security, Aug. 2017.
Fortuna, Andrea, [Online], DolphinAttack: inaudiable voice commands allow attackers to control Siri, Alexa and other digital assistants, Sep. 2017.
First Office Action, China National Intellectual Property Administration, Patent Application No. 2018800418983, Date of Issue May 29, 2020.
International Search Report and Written Opinion, International Application No. PCT/GB2020/050723, mailed Jun. 16, 2020.
Liu, Yuxi et al., "Earprint: Transient Evoked Otoacoustic Emission for Biometrics", IEEE Transactions on Information Forensics and Security, IEEE, Piscataway, NJ, US, vol. 9, No. 12, Dec. 1, 2014, pp. 2291-2301.
Seha, Sherif Nagib Abbas et al., "Human recognition using transient auditory evoked potentials: a preliminary study", IET Biometrics, IEEE, Michael Faraday House, Six Hills Way, Stevenage, Herts., UK, vol. 7, No. 3, May 1, 2018, pp. 242-250.
Liu, Yuxi et al., "Biometric identification based on Transient Evoked Otoacoustic Emission", IEEE International Symposium on Signal Processing and Information Technology, IEEE, Dec. 12, 2013, pp. 267-271.
Toth, Arthur R., et al., Synthesizing Speech from Doppler Signals, ICASSP 2010, IEEE, pp. 4638-4641.
Boesen, U.S. Appl. No. 62/403,045, filed Sep. 30, 2017.
Meng, Y. et al., "Liveness Detection for Voice User Interface via Wireless Signals in IoT Environment," in IEEE Transactions on Dependable and Secure Computing, doi: 10.1109/TDSC.2020.2973620, Feb. 13, 2020.
Zhang, L. et al., Hearing Your Voice is Not Enough: An Articulatory Gesture Based Liveness Detection for Voice Authentication, CCS '17: Proceedings of the 2017 ACM SIGSAC Conference on Computer and Communications Security, Oct. 2017 pp. 57-71.

* cited by examiner

METHODS, APPARATUS AND SYSTEMS FOR BIOMETRIC PROCESSES

The present disclosure is a continuation of U.S. Non-Provisional patent application Ser. No. 17/191,425, filed Mar. 3, 2021, issued as U.S. Pat. No. 11,714,888 on Aug. 1, 2023, which is a continuation of U.S. Non-Provisional patent application Ser. No. 16/028,964, filed Jul. 6, 2018, issued as U.S. Pat. No. 11,042,618 on Jun. 22, 2021, which claims priority to U.S. Provisional Patent Application Ser. No. 62/529,752, filed Jul. 7, 2017, and United Kingdom Patent Application No. 1801527.1, filed Jan. 30, 2018, each of which is incorporated by reference herein in its entirety.

TECHNICAL FIELD

Embodiments of the disclosure relate to methods, apparatus and systems for biometric processes, and particularly to methods, apparatus and systems for biometric processes involving the measured response of a user's ear to an acoustic stimulus.

BACKGROUND

It is known that the acoustic properties of a user's ear, whether the outer parts (known as the pinna or auricle), the ear canal or both, differ substantially between individuals and can therefore be used as a biometric to identify the user. One or more loudspeakers or similar transducers positioned close to or within the ear generate an acoustic stimulus, and one or more microphones similarly positioned close to or within the ear detect the acoustic response of the ear to the acoustic stimulus. One or more features may be extracted from the response signal, and used to characterize the individual.

For example, the ear canal is a resonant system, and therefore one feature which may be extracted from the response signal is the resonant frequency of the ear canal. If the measured resonant frequency (i.e. in the response signal) differs from a stored resonant frequency for the user, a biometric algorithm coupled to receive and analyse the response signal may return a negative result. Other features of the response signal may be similarly extracted and used to characterize the individual. For example, the features may comprise one or more mel frequency cepstrum coefficients. More generally, the transfer function between the acoustic stimulus and the measured response signal (or features of the transfer function) may be determined, and compared to a stored transfer function (or stored features of the transfer function) which is characteristic of the user.

Biometric authentication generally requires at least two processes to be carried out: enrolment and authentication (alternatively termed verification or identification). First, an authorised user enrols with the system. Enrolment comprises the collection of biometric data, and the storage of that biometric data as a model which is characteristic of the user. In the field of ear biometrics, this stored model may be known as an "ear print". Once the ear print is acquired, biometric authentication comprises the collection of biometric data from a user requesting or requiring authentication, and the comparison of that data to the stored ear print. If the data matches (i.e. to an acceptable degree), the user is authenticated and may be granted access to some restricted operation or restricted device, etc. If the data does not match (i.e. to an acceptable degree), the user is not authenticated and is not granted access to the restricted operation.

One problem faced by biometric authentication systems based on the acoustic response of a user's ear is that the response of an authorised user will vary over time. For example, the acoustic response may change in the long term, as the user ages and the shape of the ear canal changes, or in the short term as ear wax builds up. Thus, the acoustic response of an authorised user may be different at the time of authentication to the time of enrolment. If the response changes sufficiently, the user may be rejected by the authentication system, even though they are authorised and should have been authenticated—a problem known as "false rejection".

SUMMARY

Embodiments of the disclosure address this and other problems by updating, or enriching, with acquired ear model data, the stored ear model for a user following successful authentication of that user. Thus the stored ear model may be updated (or enriched) over time, to take into account changes in the acoustic response of the user's ear.

The successful authentication referred to above may be successful authentication with the ear biometric system. Thus, the user may be successfully authenticated with the ear biometric system. Following authentication, the stored ear model may be updated with new ear model data, such as the data which was acquired as part of the authentication process or data which is subsequently acquired (i.e. after authentication). In the latter case, the stored ear model may be updated only if it is determined that the device used to capture the ear model data (e.g. a personal audio device such as those described above) has not been removed from the user's ear since authentication, i.e. to prevent the user from passing the device to another person in an attempt to alter the stored model and break the authentication system.

Alternatively, the successful authentication referred to above may utilize a different authentication mechanism (which may be biometric or not). For example, an authorised user may experience rejection by the ear biometric system (i.e. false rejection), but subsequently use an alternative mechanism to successfully authenticate him or herself. In that case, the ear model data acquired during the unsuccessful ear biometric authentication attempt (i.e. before the user was successfully authenticated) may be utilized to update the stored ear model.

Ear biometric systems may lend themselves particularly to such acquisition of new ear model data, and updating of the stored model. For example, the acoustic stimulus may be generated at frequencies which are inaudible to the user, so that the user is unaware that the process is taking place. New ear model data may be acquired periodically, continuously or according to some other schedule, without the user's knowledge. Thus user intervention is not required and the stored model can be kept up to date over time.

In further embodiments, there is provided a method in a biometric authentication system for authenticating a user based on a comparison of acquired voice model data to a stored voice model. The method comprises acquiring voice model data from an input audio signal comprising a spoken input from a user; and, subsequent to successful authentication of the user (e.g., based on an ear biometric algorithm), automatically updating the stored voice model for the user with the acquired voice model data.

In another aspect, there is provided an apparatus for performing one or more biometric processes, comprising: an input for receiving voice model data of a user; and an update module configured to, subsequent to successful authentication of the user, automatically update a stored voice model for the user with the received voice model data.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

As noted above, ear biometric data may be acquired by the generation of an acoustic stimulus, and the detection of an acoustic response of the ear to the acoustic stimulus. One or more features may be extracted from the response signal, and used to characterize the individual.

The acoustic stimulus may be generated and the response measured using a personal audio device. As used herein, the term "personal audio device" is any electronic device which is suitable for, or configurable to, provide audio playback substantially to only a single user. Some examples of suitable personal audio devices are shown in FIGS. 1a to 1e.

Figure 1A:
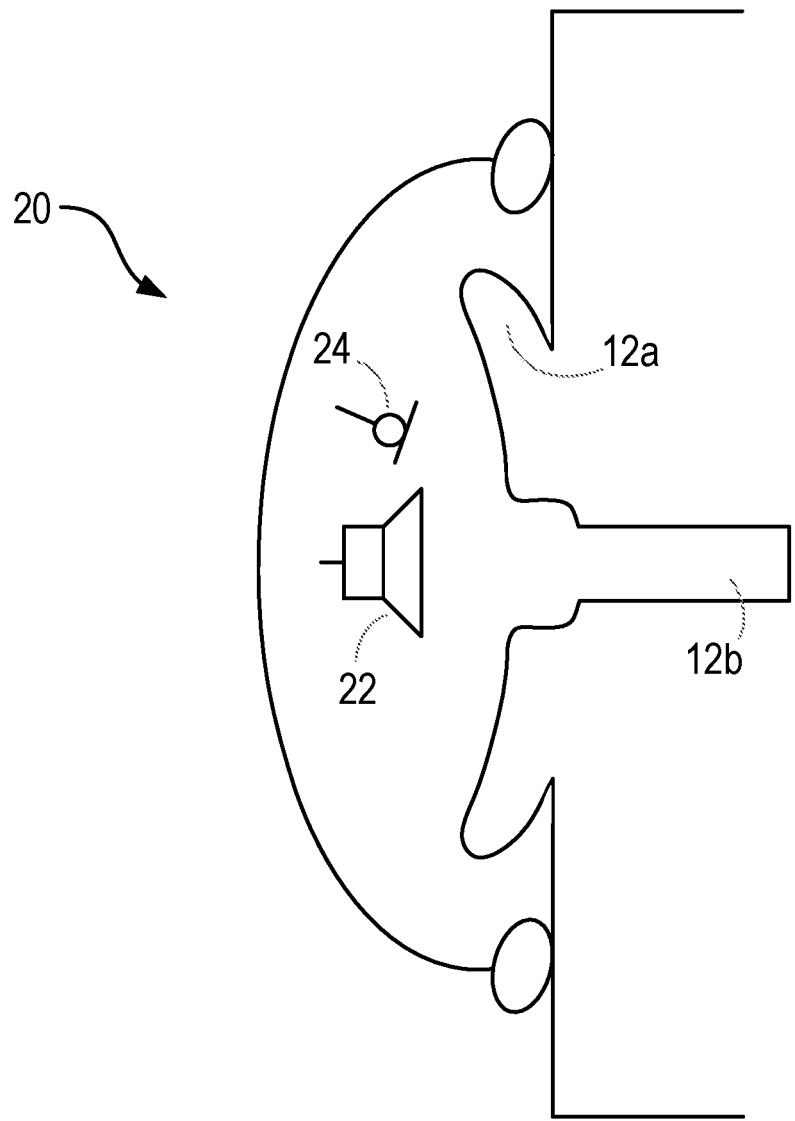
FIGS. 1a to 1e show examples of personal audio devices.

FIG. 1a shows a schematic diagram of a user's ear, comprising the (external) pinna or auricle 12a, and the (internal) ear canal 12b. A personal audio device 20 comprising a circum-aural headphone is worn by the user over the ear. The headphone comprises a shell which substantially surrounds and encloses the auricle 12a, so as to provide a physical barrier between the user's ear and the external environment. Cushioning or padding may be provided at an edge of the shell, so as to increase the comfort of the user, and also the acoustic coupling between the headphone and the user's skin (i.e. to provide a more effective barrier between the external environment and the user's ear).

The headphone comprises one or more loudspeakers 22 positioned on an internal surface of the headphone, and arranged to generate acoustic signals towards the user's ear and particularly the ear canal 12b. The headphone further comprises one or more microphones 24, also positioned on the internal surface of the headphone, arranged to detect acoustic signals within the internal volume defined by the headphone, the auricle 12a and the ear canal 12b.

The headphone may be able to perform active noise cancellation, to reduce the amount of noise experienced by the user of the headphone. Active noise cancellation operates by detecting a noise (i.e. with a microphone), and generating a signal (i.e. with a loudspeaker) that has the same amplitude as the noise signal but is opposite in phase. The generated signal thus interferes destructively with the noise and so lessens the noise experienced by the user. Active noise cancellation may operate on the basis of feedback signals, feedforward signals, or a combination of both. Feedforward active noise cancellation utilizes one or more microphones on an external surface of the headphone, operative to detect the environmental noise before it reaches the user's ear. The detected noise is processed quickly, and the cancellation signal generated so as to match the incoming noise as it arrives at the user's ear. Feedback active noise cancellation utilizes one or more error microphones positioned on the internal surface of the headphone, operative to detect the combination of the noise and the audio playback signal generated by the one or more loudspeakers. This combination is used in a feedback loop, together with knowledge of the audio playback signal, to adjust the cancelling signal generated by the loudspeaker and so reduce the noise. The microphone 24 shown in FIG. 1a may therefore form part of an active noise cancellation system, for example, as an error microphone.

Figure 1B:
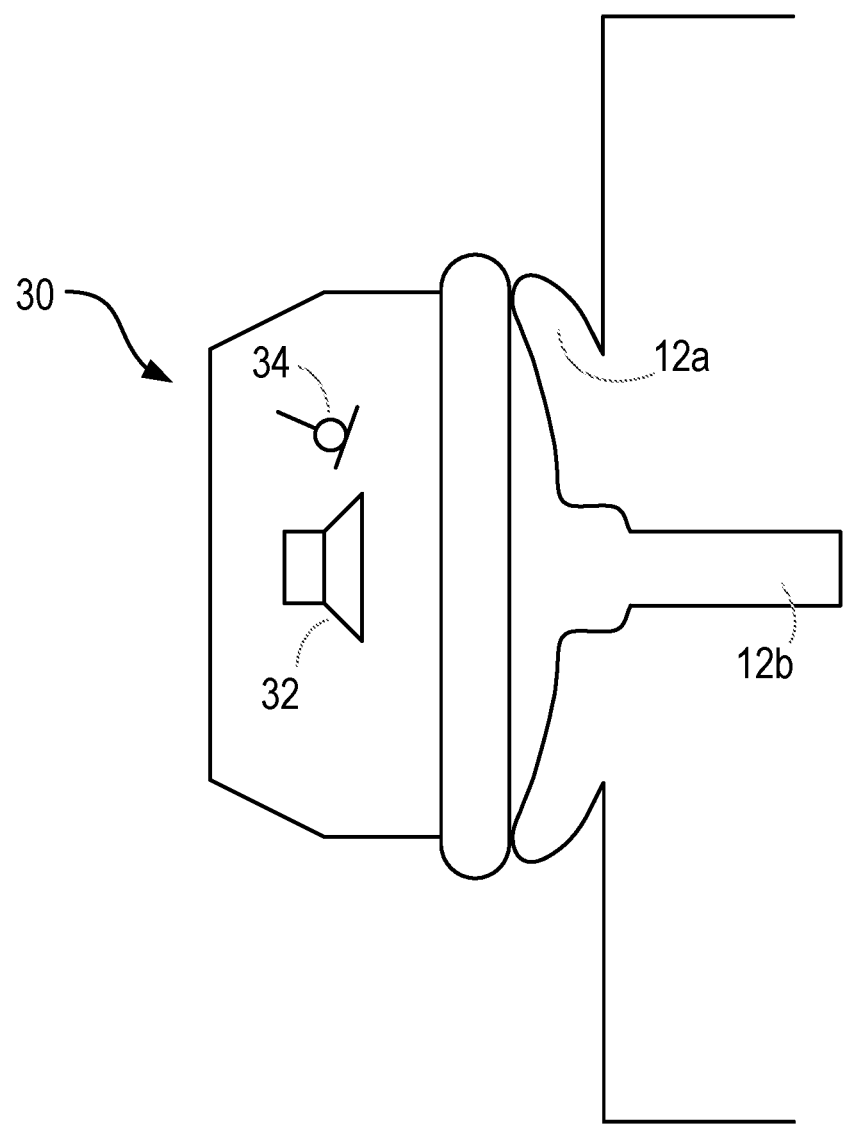

FIG. 1b shows an alternative personal audio device 30, comprising a supra-aural headphone. The supra-aural headphone does not surround or enclose the user's ear, but rather sits on the auricle 12a. The headphone may comprise a cushion or padding to lessen the impact of environmental noise. As with the circum-aural headphone shown in FIG. 1a, the supra-aural headphone comprises one or more loudspeakers 32 and one or more microphones 34. The loudspeaker(s) 32 and the microphone(s) 34 may form part of an active noise cancellation system, with the microphone 34 serving as an error microphone.

Figure 1C:
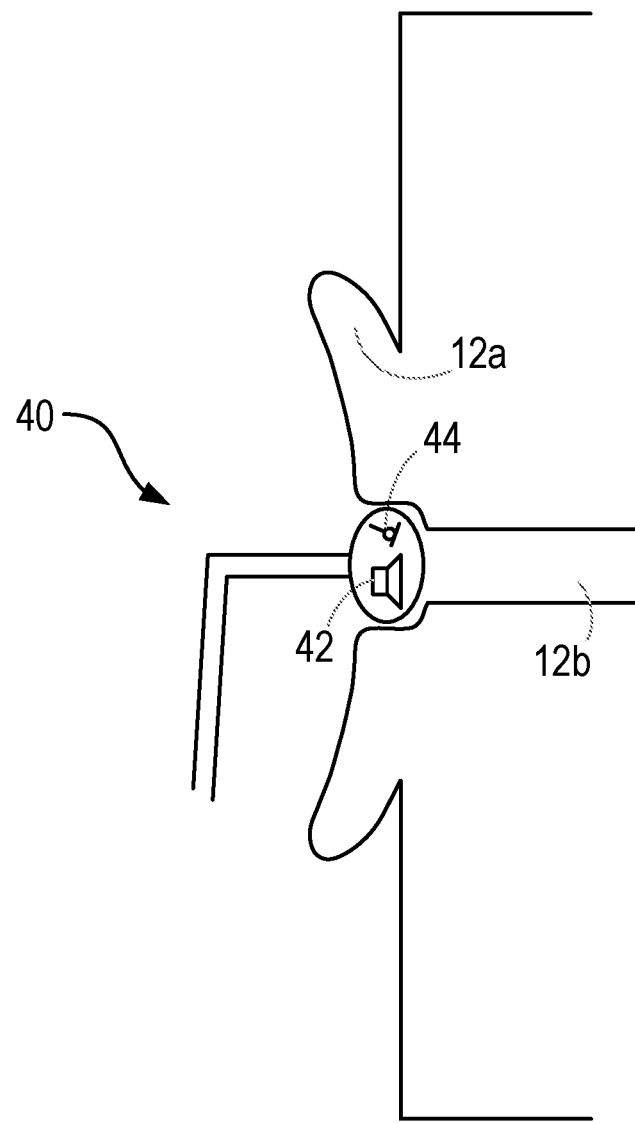

FIG. 1c shows a further alternative personal audio device 40, comprising an intra-concha headphone (or earphone). In use, the intra-concha headphone sits inside the user's concha cavity. The intra-concha headphone may fit loosely within the cavity, allowing the flow of air into and out of the user's ear canal 12b.

As with the devices shown in FIGS. 1a and 1b, the intra-concha headphone comprises one or more loudspeakers 42 and one or more microphones 44, which may form part of an active noise cancellation system.

Figure 1D:
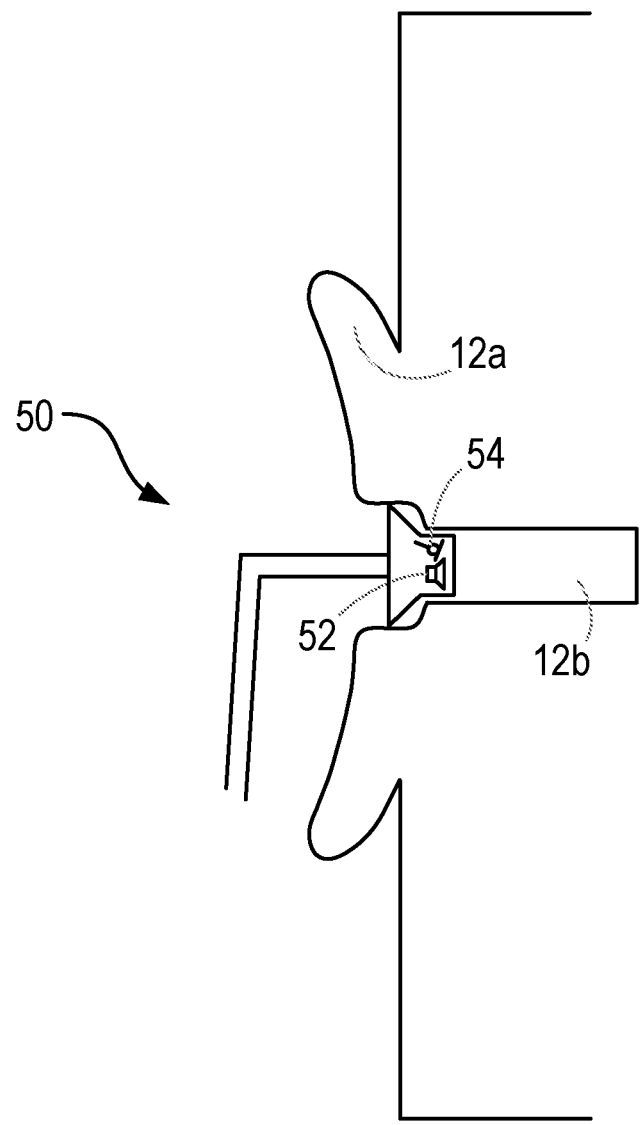

FIG. 1d shows a further alternative personal audio device 50, comprising an in-ear headphone (or earphone), insert headphone, or ear bud. This headphone is configured to be partially or totally inserted within the ear canal 12b, and may provide a relatively tight seal between the ear canal 12b and the external environment (i.e. it may be acoustically closed or sealed). The headphone may comprise one or more loudspeakers 52 and one or more microphones 54, as with the other devices described above, and these components may form part of an active noise cancellation system.

As the in-ear headphone may provide a relatively tight acoustic seal around the ear canal 12b, external noise (i.e. coming from the environment outside) detected by the microphone 54 is likely to be low.

Figure 1E:
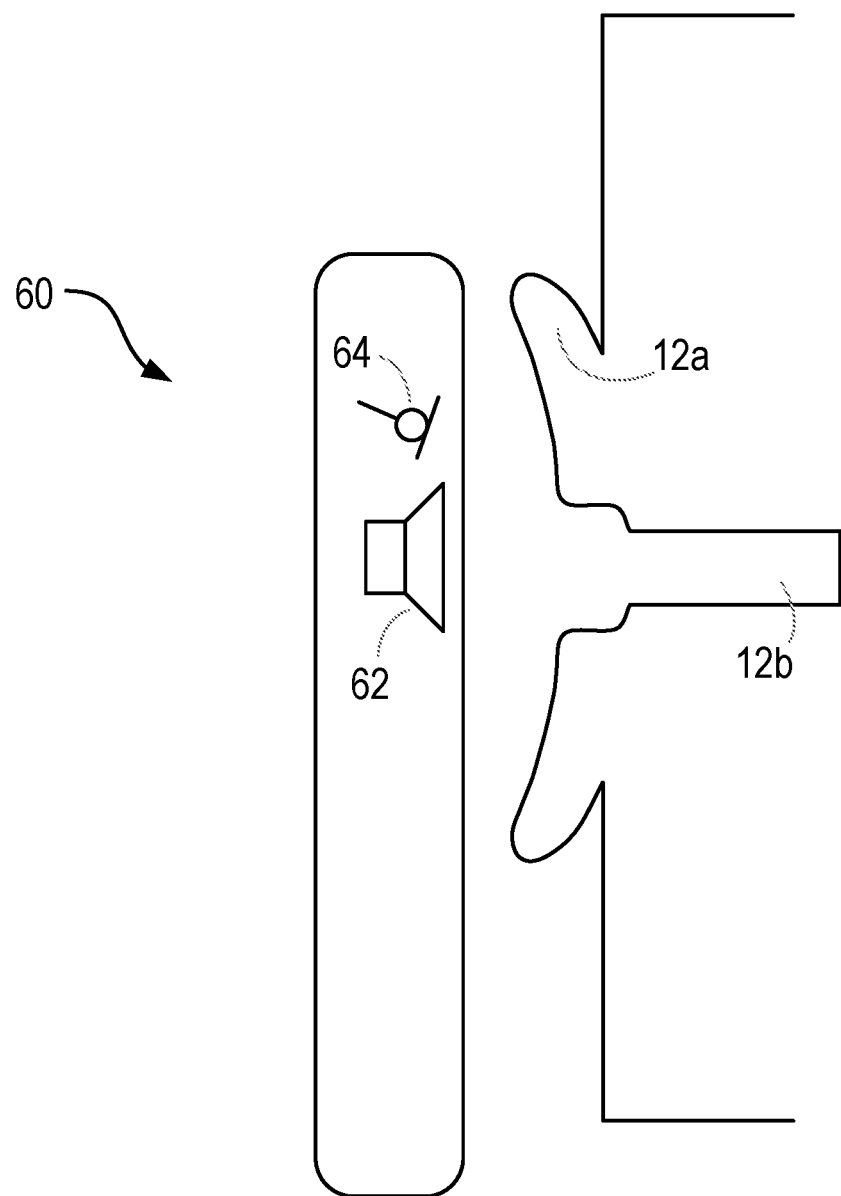

FIG. 1e shows a further alternative personal audio device 60, which is a mobile or cellular phone or handset. The handset 60 comprises one or more loudspeakers 62 for audio playback to the user, and one or more microphones 64 which are similarly positioned.

In use, the handset 60 is held close to the user's ear so as to provide audio playback (e.g. during a call). While a tight acoustic seal is not achieved between the handset 60 and the user's ear, the handset 60 is typically held close enough that an acoustic stimulus applied to the ear via the one or more loudspeakers 62 generates a response from the ear which can be detected by the one or more microphones 64. As with the other devices, the loudspeaker(s) 62 and microphone(s) 64 may form part of an active noise cancellation system.

All of the personal audio devices described above thus provide audio playback to substantially a single user in use. Each device comprises one or more loudspeakers and one or more microphones, which may be utilized to generate biometric data related to the frequency response of the user's ear. The loudspeaker is operable to generate an acoustic stimulus, or acoustic probing wave, towards the user's ear, and the microphone is operable to detect and measure a response of the user's ear to the acoustic stimulus, e.g. to measure acoustic waves reflected from the ear canal or the pinna. The acoustic stimulus may be sonic (for example in the audio frequency range of say 20 Hz to 20 kHz) or ultra-sonic (for example greater than 20 kHz or in the range 20 kHz to 50 kHz) or near-ultrasonic (for example in the range 15 kHz to 25 kHz) in frequency. In some examples the microphone signal may be processed to measure received signals of the same frequency as that transmitted.

Another biometric marker may comprise otoacoustic noises emitted by the cochlear in response to the acoustic stimulus waveform. The otoacoustic response may comprise a mix of the frequencies in the input waveform. For example if the input acoustic stimulus consists of two tones at frequencies f1 and f2, the otoacoustic emission may include a component at frequency 2*f1−f2. The relative power of frequency components of the emitted waveform has been shown to be a useful biometric indicator. In some examples therefore the acoustic stimulus may comprise tones of two or more frequencies and the amplitude of mixing products at sums or differences of integer-multiple frequencies generated by otoacoustic emissions from the cochlear may be measured. Alternatively, otoacoustic emissions may be stimulated and measured by using stimulus waveforms comprising fast transients, e.g. clicks.

Depending on the construction and usage of the personal audio device, the measured response may comprise user-specific components, i.e. biometric data, relating to the auricle 12a, the ear canal 12b, or a combination of both the auricle 12a and the ear canal 12b. For example, the circum-aural headphones shown in FIG. 1a will generally acquire data relating to the auricle 12a and potentially also the ear canal 12b. The insert headphones shown in FIG. 1d will generally acquire data relating only to the ear canal 12b.

One or more of the personal audio devices described above (or rather, the microphones within those devices) may be operable to detect bone-conducted voice signals from the user. That is, as the user speaks, sound is projected away from the user's mouth through the air. However, acoustic vibrations will also be carried through part of the user's skeleton or skull, such as the jaw bone. These acoustic vibrations may be coupled to the ear canal 12b through the jaw or some other part of the user's skeleton or skull, and detected by the microphone. Lower frequency sounds tend to experience a stronger coupling than higher frequency sounds, and voiced speech (i.e. that speech or those phonemes generated while the vocal cords are vibrating) is coupled more strongly via bone conduction than unvoiced speech (i.e. that speech or those phonemes generated while the vocal cords are not vibrating). The in-ear headphone 50 may be particularly suited to detecting bone-conducted speech owing to the tight acoustic coupling around the ear canal 12b.

All of the devices shown in FIGS. 1a to 1e and described above may be used to implement aspects of the disclosure.

Figure 2:
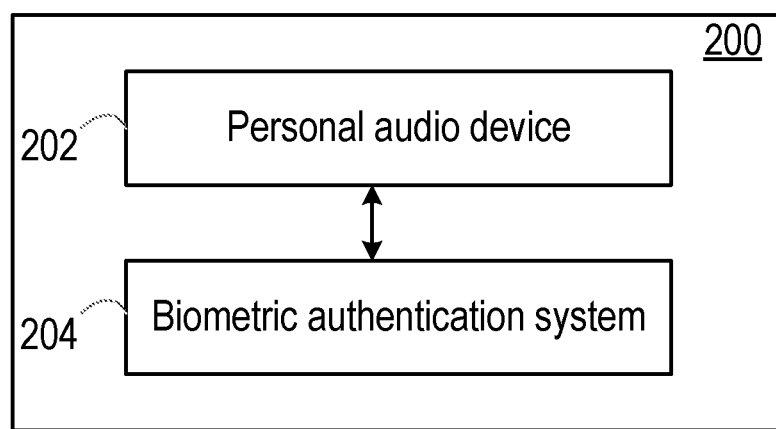
FIG. 2 shows an arrangement according to embodiments of the disclosure.

FIG. 2 shows an arrangement 200 according to embodiments of the disclosure. The arrangement 200 comprises a personal audio device 202 and a biometric system 204. The personal audio device 202 may be any device which is suitable for, or configured to provide audio playback to substantially a single user. The personal audio device 202 generally comprises one or more loudspeakers, and one or more microphones which, in use, are positioned adjacent to or within a user's ear. The personal audio device 202 may be wearable, and comprise headphones for each of the user's ears. Alternatively, the personal audio device 202 may be operable to be carried by the user, and held adjacent to the user's ear or ears during use. The personal audio device 202 may comprise headphones or a mobile phone handset, as described above with respect to any of FIGS. 1a to 1e.

The biometric system 204 is coupled to the personal audio device 202 and operative to control the personal audio device 202 to acquire biometric data which is indicative of the individual using the personal audio device 202.

The personal audio device 202 thus generates an acoustic stimulus for application to the user's ear, and detects or measures the response of the ear to the acoustic stimulus. For example, the acoustic stimulus may be in the sonic range, or ultra-sonic. In some embodiments, the acoustic stimulus may have a flat frequency spectrum, or be preprocessed in such a way that those frequencies that allow for a good discrimination between individuals are emphasized (i.e. have a higher amplitude than other frequencies). The measured response corresponds to the reflected signal received at the one or more microphones, with certain frequencies being reflected at higher amplitudes than other frequencies owing to the particular response of the user's ear.

The biometric system 204 may send suitable control signals to the personal audio device 202, so as to initiate the acquisition of biometric data, and receive data from the personal audio device 202 corresponding to the measured response. The biometric system 204 is operable to extract one or more features from the measured response and utilize those features as part of a biometric process.

Some examples of suitable biometric processes include biometric enrolment and biometric authentication. Enrolment comprises the acquisition and storage of biometric data which is characteristic of an individual. In the present context, such stored data may be known as an "ear print". Authentication comprises the acquisition of biometric data from an individual, and the comparison of that data to the stored ear prints of one or more enrolled or authorised users. A positive comparison (i.e. determination that the acquired data matches or is sufficiently close to a stored ear print) results in the individual being authenticated. For example, the individual may be permitted to carry out a restricted action, or granted access to a restricted area or device. A negative comparison (i.e. a determination that the acquired data does not match or is not sufficiently close to a stored ear print) results in the individual not being authenticated. For example, the individual may not be permitted to carry out the restricted action, or granted access to the restricted area or device.

The biometric system 204 may, in some embodiments, form part of the personal audio device 202 itself. Alternatively, the biometric system 204 may form part of an electronic host device (e.g. an audio player) to which the personal audio device is coupled, through wires or wirelessly. In yet further embodiments, operations of the biometric system 204 may be distributed between circuitry in the personal audio device 202 and the electronic host device.

As noted above, according to embodiments of the disclosure, the personal audio device 202 is utilized to obtain ear model data from the user, and the biometric authentication system 204 is operable to update a stored ear model for the user with the obtained ear model data.

Figure 3:
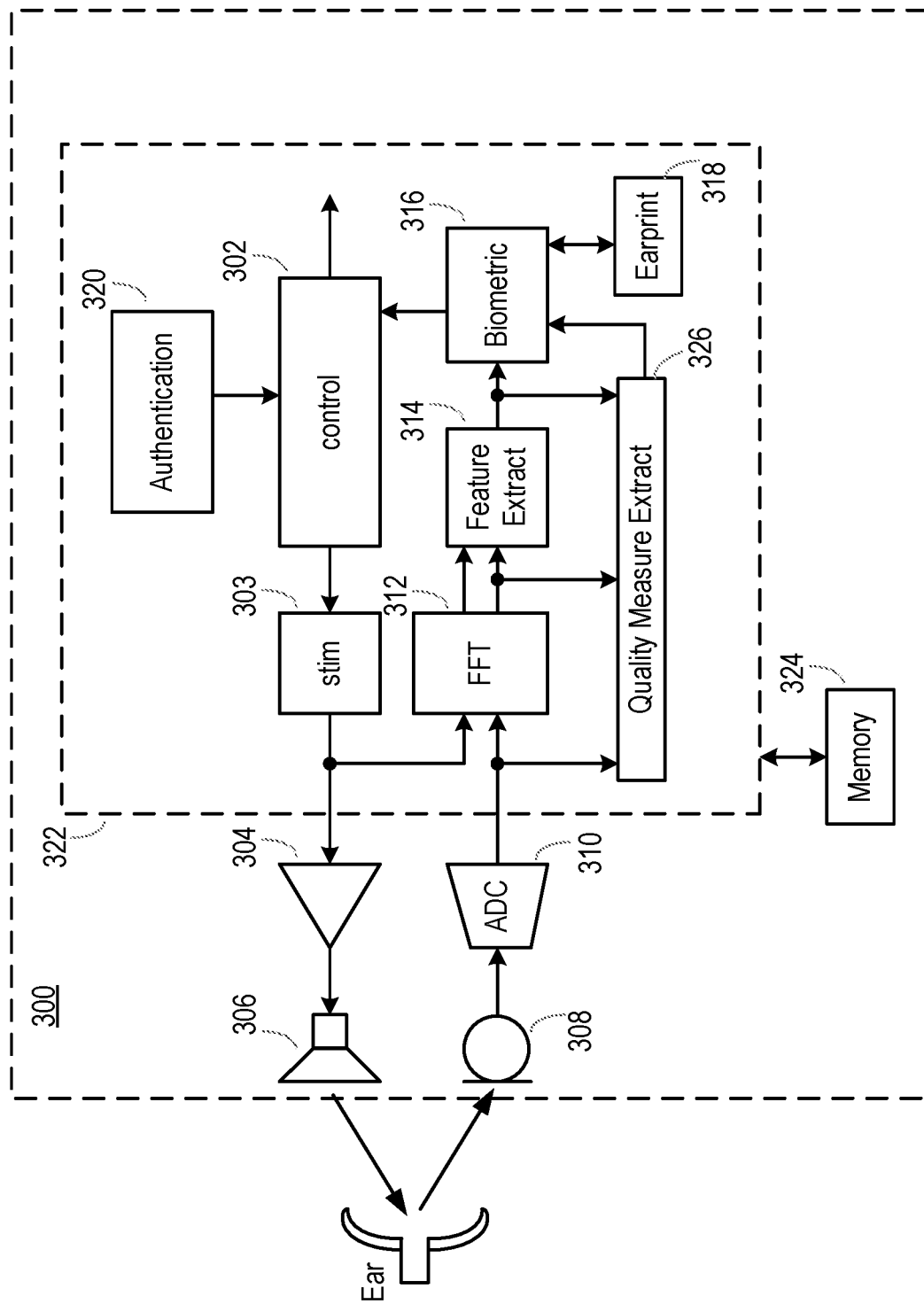
FIG. 3 shows a system according to embodiments of the disclosure.

FIG. 3 shows a system 300 according to embodiments of the disclosure.

The system 300 comprises processing circuitry 322, which may comprise one or more processors, such as a central processing unit or an applications processor (AP), or a digital signal processor (DSP). The one or more processors may perform methods as described herein on the basis of data and program instructions stored in memory 324. Memory 324 may be provided as a single component or as multiple components or co-integrated with at least some of processing circuitry 322. Specifically, the methods described herein can be performed in processing circuitry 322 by executing instructions that are stored in non-transient form in the memory 324, with the program instructions being stored either during manufacture of the system 300 or personal audio device 202 or by upload while the system or device is in use.

The processing circuitry 322 comprises a stimulus generator module 303 which is coupled directly or indirectly to an amplifier 304, which in turn is coupled to a loudspeaker 306.

The stimulus generator module 303 generates an electrical audio signal and provides the electrical audio signal to the amplifier 304, which amplifies it and provides the amplified signal to the loudspeaker 306. The loudspeaker 306 generates a corresponding acoustic signal which is output to the user's ear (or ears). The audio signal may be sonic or ultra-sonic, for example. The audio signal may have a flat frequency spectrum, or be preprocessed in such a way that those frequencies that allow for a good discrimination between individuals are emphasized (i.e. have a higher amplitude than other frequencies).

As noted above, the audio signal may be output to all or a part of the user's ear (i.e. the auricle 12a or the ear canal 12b). The audio signal is reflected off the ear, and the reflected signal (or echo signal) is detected and received by a microphone 308. The reflected signal thus comprises data which is characteristic of the individual's ear, and suitable for use as a biometric.

The reflected signal is passed from the microphone 308 to an analogue-to-digital converter (ADC) 310, where it is converted from the analogue domain to the digital domain. Of course, in alternative embodiments the microphone may be a digital microphone and produce a digital data signal (which does not therefore require conversion to the digital domain).

The signal is detected by the microphone 308 in the time domain. However, the features extracted for the purposes of the biometric process may be in the frequency domain (in that it is the frequency response of the user's ear which is characteristic). The system 300 therefore comprises a Fourier transform module 312, which converts the reflected signal to the frequency domain. For example, the Fourier transform module 312 may implement a fast Fourier transform (FFT).

The transformed signal is then passed to a feature extract module 314, which extracts one or more features of the transformed signal for use in a biometric process (e.g. biometric enrolment, biometric authentication, etc.). For example, the feature extract module 314 may extract the resonant frequency of the user's ear. For example, the feature extract module 314 may extract one or more mel frequency cepstrum coefficients. Alternatively, the feature extract module may determine the frequency response of the user's ear at one or more predetermined frequencies, or across one or more ranges of frequencies. The extracted features may correspond to data for a model of the ear.

The extracted feature(s) are passed to a biometric module 316, which performs a biometric process on them. For example, the biometric module 316 may perform a biometric enrolment, in which the extracted features (or parameters derived therefrom) are stored as part of biometric data 318 which is characteristic of the individual. The biometric data 318 may be stored within the system or remote from the system (and accessible securely by the biometric module 316). Such stored data 318 may be known as an "ear print". In another example, the biometric module 316 may perform a biometric authentication, and compare the one or more extracted features to corresponding features in the stored ear print 318 (or multiple stored ear prints) for authorised users.

The biometric module 316 may generate a biometric result (which may be the successful or unsuccessful generation of an ear print, as well as successful or unsuccessful authentication) and output the result to control module 302.

In some embodiments the stimulus waveforms may be tones of predetermined frequency and amplitude. In other embodiments the stimulus generator may be configurable to apply music to the loudspeaker, e.g. normal playback operation, and the feature extract module may be configurable to extract the response or transfer function from whatever signal components the stimulus waveform contains.

Thus in some embodiments the feature extract module 314 may be designed with foreknowledge of the nature of the stimulus, for example knowing the spectrum of the applied stimulus signal, so that the response or transfer function may be appropriately normalised. In other embodiments the feature extract module 314 may comprise a second input to monitor the stimulus (e.g. playback music) and hence provide the feature extract module with information about the stimulus signal or its spectrum so that the feature extract module 314 may calculate the transfer function from the stimulus waveform stimulus to received acoustic waveform from which it may derive the desired feature parameters. In the latter case, the stimulus signal may also pass to the feature extract module 314 via the FFT module 312.

The system 300 further comprises an authentication module 320 which, in the illustrated embodiment, is coupled to the control module 302. In other embodiments, the authentication module 320 may be coupled to the biometric module 316, for example. The authentication module 320 comprises one or more further authentication mechanisms, in addition to the ear biometric authentication carried out in the biometric module 316, for the authentication of a user as an authorised user.

For example, the authentication module 320 may comprise a voice biometric authentication module, configured to carry out a voice biometric algorithm on a voice signal provided by the user and received at the microphone 308, or a different microphone specifically provided to capture the user's voice (i.e. a voice mic). If the captured voice matches a stored voice model (i.e. a stored voice print) to an acceptable degree, the user may be authenticated as an authorised user.

As noted above, the microphone 308 may be operable to detect bone-conducted voice signals. Thus the voice biometric algorithm may be carried out on an audio signal comprising a voice signal which has been conducted via part of a user's skeleton or skull, such as the jaw bone. Alternatively or additionally, the voice biometric algorithm may be carried out on an audio signal comprising an air-conducted voice signal which has not been conducted via the user's skeleton (and such as may be detected by a voice mic for example).

The voice biometric algorithm may further comprise a check that the bone-conducted voice signal (i.e. detected in the microphone 308) and the air-conducted voice signal (i.e. detected in a voice mic) match to an acceptable degree, i.e. correspond. This will provide an indication that the personal audio device (i.e. that which comprises the microphone 308) is being worn by the same user as is speaking into the voice microphone.

For example, the authentication module 320 may comprise an input-output mechanism for accepting and authorising the user based on a passphrase, password, or pin number entered by the user and associated with the authorised user. The input-output mechanism may pose a question to the user based on the passphrase, password or pin number, the answer to which does not reveal the entire passphrase, password or pin number. For example, the question may relate to a particular character or digit of the passphrase, password or pin number (e.g., "what is the third character of the password?"). The question may require the performance of a mathematical operation on the pin number or part thereof (e.g., "what is the first digit of the pin number plus three?"). The input-output mechanism may output the question audibly (e.g. through playback over the loudspeaker 306), so that only the user can hear the question. Further, the input-output mechanism may provide for input of the answer audibly (e.g. through the microphone 308 or some other microphone such as a voice mic), or via some other input mechanism, such as a touchscreen, keypad, keyboard, or similar.

According to embodiments of the disclosure, the system 300 is operable to update a stored ear print 318 (i.e. a stored ear model) for an authorised user following successful authentication of a user as that authorised user. Such an update may comprise or consist of enrichment of the stored ear print 318.

Thus, a user is enrolled with the biometric module 316 (i.e. through the acquisition of ear model data—the generation of an acoustic stimulus towards the user's ear, the detection of a response, and the extraction of one or more features from that response) and an ear print 318 stored for the user.

The user may later seek authentication via the system 300, and thus further ear model data is acquired for that purpose as described above. If the authentication is successful, the biometric module 316 may return a positive authentication message to the control module 302, and update the stored ear print 318 for the user based on the acquired ear model data (as the acquired ear model data is unlikely to match the stored ear model exactly).

If the authentication is unsuccessful, the biometric module 316 may return a negative authentication message to the control module 302. However, the system 300 comprises one or more further authentication modules 320. If the user is subsequently successfully authenticated via one or more of these mechanisms, the control module 302 may issue an instruction to the biometric module 316 to update the stored ear model 318 for the user with the data which was acquired as part of the unsuccessful ear biometric authentication attempt.

Additionally or alternatively, the update of the stored ear model 318 for the user may be based on ear model data which is acquired solely for that purpose (i.e. rather than as part of a successful or failed authentication attempt). Once successfully authenticated, the control module 302 may control the system 300 to acquire further ear model data utilizing the speaker 306 and the microphone 308 with or without the user's knowledge. The acquisition of such data may be periodic, continuous, at a defined schedule or according to detection of one or more defined events. The acoustic stimulus generated by the loudspeaker 306 may be inaudible to the user, so the additional ear model data may be acquired without the user's knowledge.

The update of the stored ear model 318 for the user may be further subject to an in-ear (or on-ear) detection mechanism, which detects whether the personal audio device (i.e. at least the speaker 306 and the microphone 308) are being actively worn by the user (and remain actively worn during and/or throughout the relevant period). Various mechanisms are suitable for such a purpose. For example, the signal detected by the microphone 308 may be analysed to determine whether it is characteristic of a small volume (i.e. the volume inside the ear canal and/or within a headphone shell). For example, an optical mechanism in the personal audio device may detect the presence of light and so conclude that the personal audio device has been removed from the user's head. For example, an accelerometer in the personal audio device may detect movement which is inconsistent with the motion of a user's head.

The update of the stored ear model 318 may be carried out only if it is determined that the personal audio device has not been removed from the user's head between the successful authentication (by whatever mechanism) and the acquisition of the ear model data. Thus, the stored ear model 318 may not be updated, or additional ear model data may not be acquired, if it is detected that the personal audio device is removed from the user's head following successful authentication.

The stored ear model 318 may be updated at a fixed or dynamically adjustable rate. For example, in further embodiments, the new data is weighted by a coefficient $\alpha$ which may be configured dynamically. For example, $\alpha$ may be configured based on one or more quality metrics derived from the response signal or the biometric data.

For this purpose, system 300 may comprise a quality measure module 326 coupled to the signal processing chain in one or more places, and operable to receive the outputs of one or more of: the microphones 308; the ADC 310; the Fourier transform module 312; and the feature extract module 314. The quality metrics may therefore relate to the signal in the time domain, the frequency domain, or the extracted features.

The one or more quality metrics may comprise one or more of: signal to noise ratio; the presence of clipping in the signal; one or more spectral parameters (such as spectral peaking, spectral flatness, spectral tilt, etc.); energy per frequency bin; statistical measures of the distributions of the extracted features, etc.

The calculated quality metric(s) may be output to the biometric module 316, which may then determine the weight to be given to the new data based on the quality metrics. Thus if the quality of the biometric data is low (e.g. below some threshold value) or the biometric data is determined to be invalid based on the quality metric(s) (e.g. according to a decision module), the weighting coefficient may be adjusted (i.e. reduced) to reduce the influence of the new data on the stored model 318. In some embodiments, the weighting may be adjusted so that the new data is not used to update the stored model 318 at all (i.e. the weighting is zero).

Figure 4:
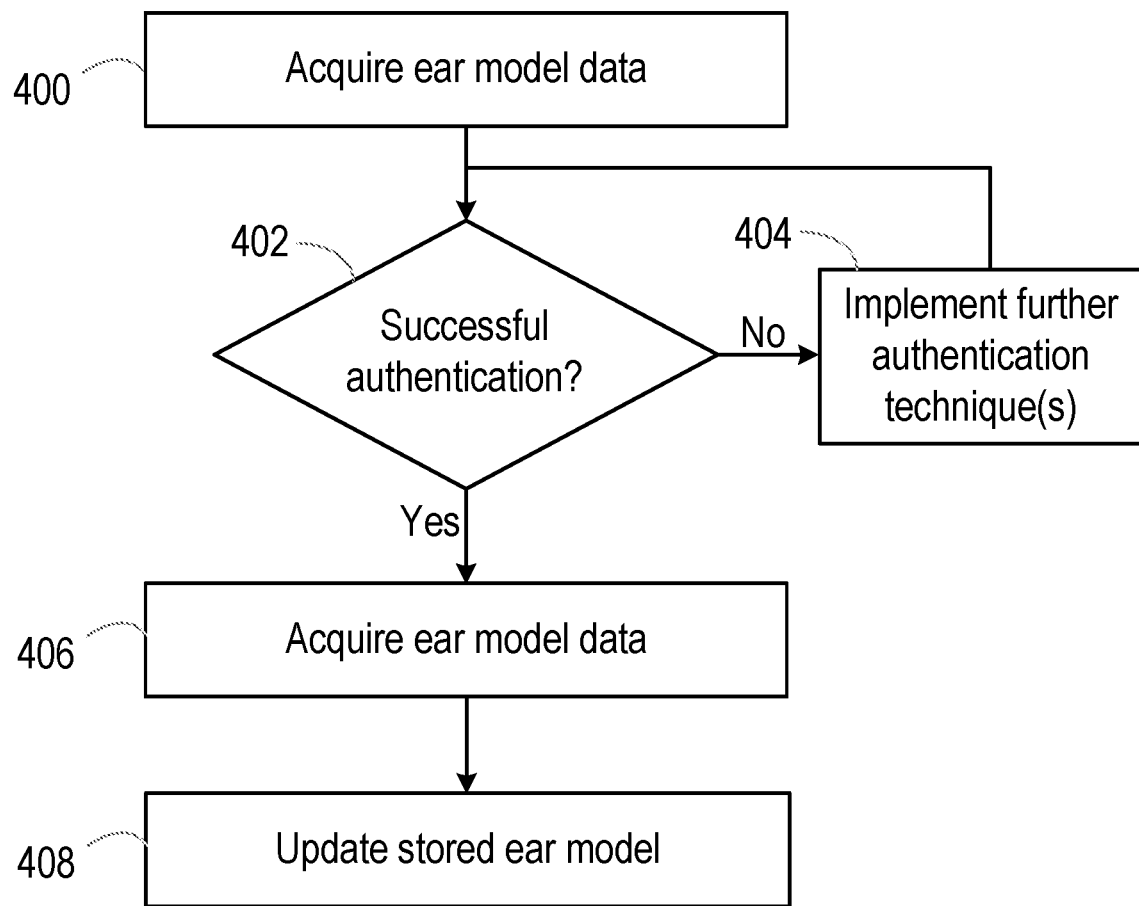
FIG. 4 is a flowchart of a method according to embodiments of the disclosure.

FIG. 4 is a flowchart of a method according to embodiments of the disclosure.

In step 400, the biometric system acquires ear model data. For example, the biometric system may acquire ear model data from a personal audio device, which generates an acoustic stimulus for application to the user's ear, and extract one or more features from the measured response to that acoustic stimulus (e.g. as detected with a microphone in the personal audio device).

In step 402, it is determined whether a successful authentication has taken place. For example, the system may attempt to authenticate the user based on the ear model data acquired in step 400, via a comparison to one or more stored ear models for one or more authorised users.

If the authentication attempt is unsuccessful, the method may proceed to step 404, in which one or more further authentication techniques are implemented.

For example, the user's voice may be subject to a voice biometric algorithm, or the user may be required to enter all or part of a password, passphrase or pin number.

The method returns to step 402, in which it is determined whether authentication of the user has been successful (i.e. the user has been identified as an authorised user). If authentication is again unsuccessful, the user may be denied access to whatever restricted operation or device he or she is attempting to gain access to.

However, if the authentication is successful (either initially, based on the ear model data acquired in step 400, or subsequently based on one or more further mechanisms in step 404), the method proceeds to an optional step 406 in which further ear model data is acquired. Thus ear model data may be acquired from the personal audio device, which generates an acoustic stimulus for application to the user's ear, and one or more features extracted from the measured response to that acoustic stimulus (e.g. as detected with a microphone in the personal audio device).

In step 408, the stored ear model for the authorised user is updated with the ear model data acquired in step 400, in step 406, or both. For example, parameters of the stored ear model may be updated as follows:

$$\mu_{new} = \alpha \mu_{stored} + (1-\alpha)\mu_{calc}$$

where $\alpha$ is a coefficient between 0 and 1, $\mu_{new}$ is the new (i.e. updated) stored ear model, $\mu_{stored}$ is an old (i.e. previous) stored ear model parameter, and $\mu_{calc}$ is the ear model data parameter newly acquired. Thus the new ear model is based on a combination of the previous ear model and the newly acquired ear model data. Of course, alternative expressions could be used to achieve much the same effect. The value of the coefficient $\alpha$ may be set as required to achieve a desired rate of change of the stored ear model. For example, it may be desired that the ear model changes relatively slowly, so as to make the system difficult to break. $\alpha$ may therefore be set at a value which is close to 1 (e.g. 0.95 or higher).

In further embodiments, $\alpha$ may be configured dynamically. For example, $\alpha$ may be configured based on one or more quality metrics derived from the measured response signal or the biometric data acquired in step 400. The quality metrics may relate to the signal in the time domain, the frequency domain, or the extracted features.

The one or more quality metrics may comprise one or more of: signal to noise ratio; the presence of clipping in the signal; one or more spectral parameters (such as spectral peaking, spectral flatness, spectral tilt, etc); energy per frequency bin, etc. Thus if the quality of the biometric data is low (e.g. below some threshold value) or the biometric data is determined to be invalid based on the quality metric(s) (e.g. according to a decision module), the weighting coefficient $\alpha$ may be adjusted accordingly (i.e. reduced) to reduce the influence of the new data on the stored model.

Thus the present disclosure provides methods, apparatus and systems for updating a stored ear model for use in an ear biometric authentication system.

In some embodiments, the stored ear model may be updated or enriched upon successful authentication via an alternative mechanism than ear biometric authentication (such as voice biometric authentication). In alternative embodiments, the present disclosure provides methods, apparatus and systems for updating a stored voice model (or voice print) upon successful authentication via the ear biometric system.

Figure 5:
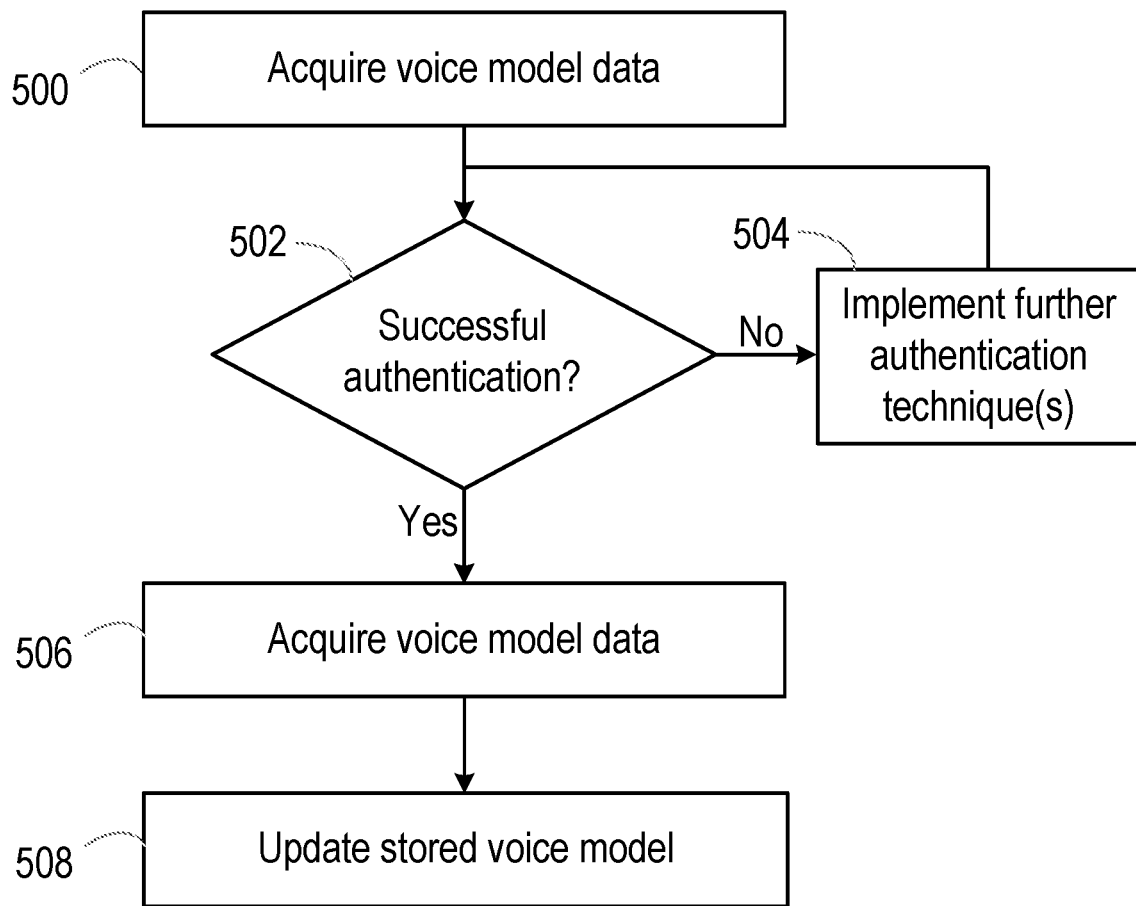
FIG. 5 is a flowchart of a method according to further embodiments of the disclosure.

FIG. 5 is a flowchart of a method according to such alternative embodiments.

In step 500, the biometric system acquires voice model data. For example, a user may provide a spoken input (e.g., a predetermined password or phrase, or free speech) which is processed so as to extract one or more biometric features (e.g. as detected with a microphone in the personal audio device).

In step 502, it is determined whether a successful authentication has taken place. For example, the system may attempt to authenticate the user based on the voice model data acquired in step 500, via a comparison to one or more stored voice models for one or more authorised users.

If the authentication attempt is unsuccessful, the method may proceed to step 504, in which one or more further authentication techniques are implemented.

For example, the one or more further authentication techniques may comprise an ear biometric algorithm (e.g. such as described above), in which ear model data may be acquired from the personal audio device, which generates an acoustic stimulus for application to the user's ear, and one or more features extracted from the measured response to that acoustic stimulus (e.g. as detected with a microphone in the personal audio device). Alternatively or additionally, the user may be required to enter all or part of a password, passphrase or pin number.

The method returns to step 502, in which it is determined whether authentication of the user has been successful (i.e. the user has been identified as an authorised user). If authentication is again unsuccessful, the user may be denied access to whatever restricted operation or device he or she is attempting to gain access to.

However, if the authentication is successful (either initially, based on the voice model data acquired in step 500, or subsequently based on one or more further mechanisms in step 504), the method proceeds to an optional step 506 in which further voice model data is acquired. For example, the user may be required to provide a further spoken input (e.g. repeating the password or passphrase).

In step 508, the stored voice model for the authorised user is updated with the voice model data acquired in step 500, in step 506, or both. For example, parameters of the stored voice model may be updated as follows:

$$\mu_{new} = \alpha \mu_{stored} + (1-\alpha)\mu_{calc}$$

where $\alpha$ is a coefficient between 0 and 1, $\mu_{new}$ is the new (i.e. updated) stored voice model, $\mu_{stored}$ is an old (i.e. previous) stored voice model parameter, and $\mu_{calc}$ is the voice model data parameter newly acquired. Thus the new voice model is based on a combination of the previous voice model and the newly acquired voice model data. Of course, alternative expressions could be used to achieve much the same effect. The value of the coefficient $\alpha$ may be set as required to achieve a desired rate of change of the stored voice model. For example, it may be desired that the voice model changes relatively slowly, so as to make the system difficult to break. $\alpha$ may therefore be set at a value which is close to 1 (e.g. 0.95 or higher).

In further embodiments, $\alpha$ may be configured dynamically. For example, $\alpha$ may be configured based on one or more quality metrics derived from the measured response signal or the biometric data acquired in step 500 or step 506.

The quality metrics may relate to the signal in the time domain, the frequency domain, or the extracted features.

The one or more quality metrics may comprise one or more of: signal to noise ratio; the presence of clipping in the signal; one or more spectral parameters (such as spectral peaking, spectral flatness, spectral tilt, etc); energy per frequency bin, etc. Thus if the quality of the biometric data is low (e.g. below some threshold value) or the biometric data is determined to be invalid based on the quality metric(s) (e.g. according to a decision module), the weighting coefficient $\alpha$ may be adjusted accordingly (i.e. reduced) to reduce the influence of the new data on the stored model.

Thus the present disclosure additionally provides methods, apparatus and systems for updating a stored voice model for use in a voice biometric authentication system.

Embodiments may be implemented in an electronic, portable and/or battery powered host device such as a smartphone, an audio player, a mobile or cellular phone, a handset. Embodiments may be implemented on one or more integrated circuits provided within such a host device. Embodiments may be implemented in a personal audio device configurable to provide audio playback to a single person, such as a smartphone, a mobile or cellular phone, headphones, earphones, etc. See FIGS. 1a to 1e. Again, embodiments may be implemented on one or more integrated circuits provided within such a personal audio device. In yet further alternatives, embodiments may be implemented in a combination of a host device and a personal audio device. For example, embodiments may be implemented in one or more integrated circuits provided within the personal audio device, and one or more integrated circuits provided within the host device.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments and implementations likewise, with the benefit of this disclosure, will be apparent to those having ordinary skill in the art, and such embodiments should be deemed as being encompassed herein. Further, those having ordinary skill in the art will recognize that various equivalent techniques may be applied in lieu of, or in conjunction with, the discussed embodiments, and all such equivalents should be deemed as being encompassed by the present disclosure.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

It should be noted that the above-mentioned embodiments illustrate rather than limit the invention, and that those skilled in the art will be able to design many alternative embodiments without departing from the scope of the appended claims or embodiments. The word "comprising" does not exclude the presence of elements or steps other than those listed in a claim or embodiment, "a" or "an" does not exclude a plurality, and a single feature or other unit may fulfil the functions of several units recited in the claims or embodiments. Any reference numerals or labels in the claims or embodiments shall not be construed so as to limit their scope.

The invention claimed is:

1. A method in a biometric authentication system, the biometric authentication system for authenticating a user based on a comparison of an ear model, derived from a measured response to an acoustic stimulus applied to the user's ear, to a stored ear model for the user, the method comprising:
   acquiring ear model data of the user's ear; and
   subsequent to successful authentication of the user, automatically updating the stored ear model for the user with the acquired ear model data, wherein successful authentication comprises a determination that an air-conducted voice signal and a bone-conducted voice signal correspond.

2. The method according to claim 1, wherein the step of acquiring ear model data of the user's ear is subsequent to successful authentication of the user.

3. The method according to claim 1, wherein the ear model data of the user's ear is acquired utilizing a personal audio device for generation of the acoustic stimulus and detection of the measured response.

4. The method according to claim 3, wherein the ear model data of the user's ear is acquired upon insertion of the personal audio device in the user's ear, or upon placement of the personal audio device adjacent to the user's ear.

5. The method according to claim 3, wherein the step of acquiring ear model data of the user's ear is subsequent to successful authentication of the user, and wherein the step of acquiring the ear model data is responsive to a determination that the personal audio device has not been removed from the user's ear.

6. The method according to claim 1, wherein successful authentication comprises successful authentication with the biometric authentication system.

7. The method according to claim 1, wherein successful authentication comprises successful authentication via an alternative mechanism than the biometric authentication system.

8. The method according to claim 7, wherein the alternative mechanism comprises one or more of: pin authentication; password or pass-phrase authentication; voice authentication.

9. The method according to claim 8, wherein voice authentication comprises authentication of one or more of: the air-conducted voice signal and the bone-conducted voice signal.

10. The method according to claim 7, wherein the step of acquiring ear model data of the user's ear is prior to successful authentication of the user.

11. The method according to claim 1, wherein updating comprises combining the acquired ear model data with the stored ear model for the user.

12. The method according to claim 11, wherein the acquired ear model data is weighted according to one or more quality metrics of the acquired ear model data for combination with the stored ear model for the user.

13. The method according to claim 1, wherein the step of acquiring ear model data comprises:
    initiating generation of an acoustic stimulus for application to the user's ear; and
    extracting, as the ear model data, one or more features from a measured response of the user's ear to the acoustic stimulus.

14. The method according to claim 13, wherein the response is measured with a microphone of a personal audio device, and wherein the microphone is further operable as part of an active noise cancellation system.

15. The method according to claim 13, wherein the one or more features are extracted from the measured response based on the acoustic stimulus.

16. An apparatus for authenticating a user based on a comparison of an ear model, derived from a measured response to an acoustic stimulus applied to the user's ear, to a stored ear model for the user, comprising:
    an input for receiving ear model data of the user's ear; and
    an update module configured to, subsequent to successful authentication of the user, automatically update a stored ear model for the user with the received ear model data, wherein successful authentication comprises a determination that an air-conducted voice signal and a bone-conducted voice signal correspond.

17. The apparatus according to claim 16, further comprising:
    biometric circuitry configured to extract, as the ear model data, one or more features from a measured response of the user's ear to an acoustic stimulus.

18. The apparatus according to claim 17, wherein the biometric circuitry is configured to extract one or more features from the measured response based on the acoustic stimulus.

19. A non-transitory machine-readable medium storing instructions which, when executed by processing circuitry of an electronic apparatus, which electronic apparatus further comprises a biometric authentication system for authenticating a user based on a comparison of an ear model, derived from a measured response to an acoustic stimulus applied to the user's ear, to a stored ear model for the user, cause the electronic apparatus to:
    acquire ear model data of the user's ear; and
    subsequent to successful authentication of the user, automatically update the stored ear model for the user with the acquired ear model data, wherein successful authentication comprises a determination that an air-conducted voice signal and a bone-conducted voice signal correspond.

* * * * *